US012784153B2

(12) United States Patent
Ollila

(10) Patent No.: US 12,784,153 B2
(45) Date of Patent: Nov. 3, 2026

(54) GAZE-DIRECTED DENOISING IN MULTI-CAMERA SYSTEMS

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 446 days.

(21) Appl. No.: 18/467,800

(22) Filed: Sep. 15, 2023

(65) Prior Publication Data

US 2025/0095113 A1 Mar. 20, 2025

(51) Int. Cl.

| | |
|---|---|
| ***G06T 5/00*** | (2024.01) |
| ***G06F 3/01*** | (2006.01) |
| ***G06T 5/70*** | (2024.01) |
| ***G06V 10/25*** | (2022.01) |
| ***G06V 10/46*** | (2022.01) |
| ***G06V 10/60*** | (2022.01) |

(52) U.S. Cl.

CPC ................ *G06T 5/70* (2024.01); *G06F 3/013* (2013.01); *G06V 10/25* (2022.01); *G06V 10/462* (2022.01); *G06V 10/60* (2022.01)

(58) Field of Classification Search

CPC ........... G06T 5/70; G06T 7/246; G06T 7/292; G06T 7/97; G06T 2207/10052; G06T 2207/20182; G06V 10/25; G06V 10/30; G06V 10/46; G06V 10/462; G06V 10/60; G06V 10/751; G06V 30/19073; G06F 3/005; G06F 3/013; H04N 23/70; H04N 23/74; H04N 23/90; H04N 23/843

See application file for complete search history.

(56) References Cited

U.S. PATENT DOCUMENTS

| | | | | |
|---|---|---|---|---|
| 2016/0309133 | A1* | 10/2016 | Laroia | G06T 5/20 |
| 2017/0238396 | A1* | 8/2017 | Knibbe | H05B 47/105 315/151 |
| 2018/0160101 | A1* | 6/2018 | Price | G02B 19/0047 |
| 2019/0246025 | A1* | 8/2019 | Duran | G03B 15/03 |
| 2021/0329221 | A1* | 10/2021 | Arbabian | G06F 16/55 |
| 2022/0035160 | A1* | 2/2022 | Bedard | G02B 3/0062 |
| 2022/0394181 | A1* | 12/2022 | Venkatesan | H04N 23/45 |

* cited by examiner

*Primary Examiner* — Oneal R Mistry
*Assistant Examiner* — Duy Tran
(74) *Attorney, Agent, or Firm* — ZIEGLER IP LAW GROUP, LLC.

(57) ABSTRACT

When a first camera has a first value of an illumination parameter in first region(s) of a first field of view (FOV) of the first camera, while a second camera has, in corresponding region(s) of a second FOV of the second camera, a second value of the illumination parameter that is greater than the first value, a denoising technique is applied on first image segment(s) of the first image that represents the first region(s), based on corresponding image segment(s) of the second image that represents the corresponding region(s). The illumination parameter is any one of: (i) a ratio of a per-pixel area to pixels per degree (PPD), (ii) a ratio of a multiplication product of the per-pixel area and a relative illumination to the PPD.

13 Claims, 4 Drawing Sheets

GAZE-DIRECTED DENOISING IN MULTI-CAMERA SYSTEMS

TECHNICAL FIELD

The present disclosure relates to imaging systems incorporating denoising in multi-camera systems. The present disclosure also relates to methods incorporating denoising in multi-camera systems.

BACKGROUND

Nowadays, with increase in number of images being captured every day, there is an increased demand for image processing to generate images having high resolution, minimal/no noise and blur, and considerably high brightness, for example, especially in a low-light environment (for example, an indoor environment). Existing equipment and techniques for capturing such images are based on increasing an aperture size of a camera, increasing a sensitivity (i.e., ISO) of the camera, reducing a shutter speed (i.e., increasing an exposure time) of the camera, and the like. Even when the aperture size is fixed (for example, in the case of smartphone cameras), an overall brightness in an image can only be adjusted by changing the sensitivity and exposure time. However, the two aforesaid factors are negatively correlated. This means that for capturing shorter-exposure images, a high ISO is employed, whereas for capturing longer-exposure images, a low ISO is employed. Moreover, a high ISO configuration introduces inevitable and complex noise due to a limited number of photons/light reaching an image sensor of the camera as well as due to image signal processing (ISP), whereas a high exposure time is prone to produce blurry images caused due to a camera shake and presence of dynamic content in a real-world scene.

With respect to extended-reality (XR) devices that usually operate at a high framerate (such as 90 frames per second (FPS) or above), image capturing and generation is even more challenging in the low-light environment. This is because changing the exposure time and the aperture sizes are not available as a framerate is not allowed to drop below the high framerate and also to avoid a motion sickness. Optics used in such XR devices usually have very strong negative distortion in order to get a high resolution (such as in terms of pixels per degree) at a center of an image. For achieving the high framerate, a number of pixels that are to be read from an image sensor is limited, so only a limited portion of a field of view of the camera is read out unless the PPD reduces on going away from a central region of the field of view towards a peripheral region of the field of view. The PPD is indirectly related to a light receiving capability of pixels of the image sensor. This is due to the fact that for a high PPD, a same amount of light would incident towards (namely, would be distributed amongst) a greater number of pixels of an image sensor, as compared to that for a low PPD. This is because an angular width per pixel reduces when there are greater number of pixels, and an area of the image sensor whereat light is incident is directly proportional to a square of the PPD. Greater the PPD, greater is the probability of capturing a given region of a given image with noise and low brightness, and vice versa. Moreover, luminance shading correction may worsen such noise even more at an expense of an improved/uniform brightness. This is because noisy pixels are digitally multiplied, and their noise amplitude is also multiplied.

Referring to FIG. 1A, illustrated is a typical variation of an intensity of light upon passing through optics of a camera of an extended-reality (XR) device as a function of an angular width of a field of view (FOV) of said camera. As shown, the intensity of the light (for example, depicted using a non-uniform pattern of circularly-shaped spots that depict darker portions) varies spatially across the FOV of said camera. The intensity of the light is minimum at a central region of the FOV, and (gradually) increases on going away from the central region towards a peripheral region of the FOV to reach a maximum intensity of light, and then again decreases. As an example, for an angular width of approximately 30 degrees in a donut-shaped peripheral region of the FOV, the optics of said camera may receive an intensity of light that is 40 percent higher as compared to an intensity of light received for the central region. In terms of aperture sizes or F-numbers, the amount of light received for the central region may be equivalent to F2.8, whereas the amount of light received in the donut-shaped peripheral region may be equivalent to F2.2. In this regard, an image captured using said camera would have spatially-variable brightness across its FOV i.e., a central portion of the image would appear to be dim/dark, while a peripheral portion of the image would appear to be bright.

Referring to FIG. 1B, illustrated is an exemplary graphical representation of a variation of an illumination parameter for said camera as a function of the angular width of the FOV of said camera. As shown, the illumination parameter varies spatially across the FOV in a manner that a value of the illumination parameter may be low towards a central region of the FOV, then gradually increases on going away from the central region towards a peripheral region of the FOV to reach a maximum value, and then again decreases, the central region being surrounded by the peripheral region.

Referring to FIG. 1C, illustrated is an exemplary graphical representation of a variation of an angular resolution of said camera as a function of the angular width of the FOV of said camera. As shown, the angular resolution of said camera is maximum at a central region of the FOV of the camera, and decreases on going away from the central region towards a peripheral region of the FOV, the peripheral region of the FOV surrounding the central region of the given FOV. The angular resolution is, for example, expressed in terms of pixels per degree (PPD).

Therefore, in light of the foregoing discussion, there exists a need to overcome the aforementioned drawbacks.

SUMMARY

The present disclosure seeks to provide high-resolution, blur-free, denoised images in real time or near-real time. The aim of the present disclosure is achieved by an imaging system and a method which incorporate denoising in multi-camera systems, as defined in the appended independent claims to which reference is made to. Advantageous features are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1B illustrates an exemplary graphical representation of a variation of an illumination parameter for said camera as a function of the angular width of the FOV of said camera, while

FIGS. 4A and 4B illustrate two different exemplary scenarios of imaging an object present in a real-world environment, while

DETAILED DESCRIPTION OF EMBODIMENTS

Figure 1A:
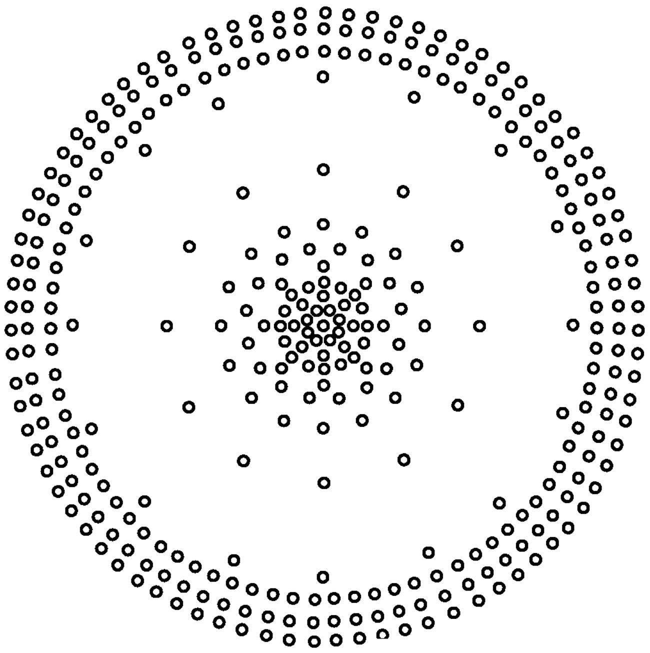
FIG. 1A illustrates a typical variation of an intensity of light upon passing through optics of a camera of an extended-reality (XR) device as a function of an angular width of a field of view (FOV) of said camera.
Figure 1B:
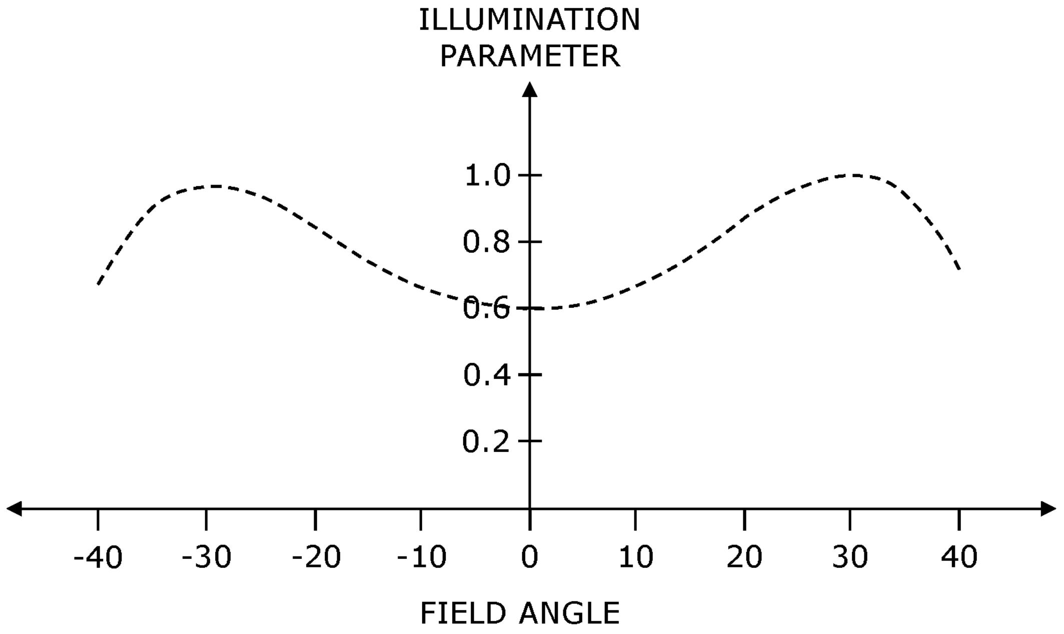
Figure 1C:
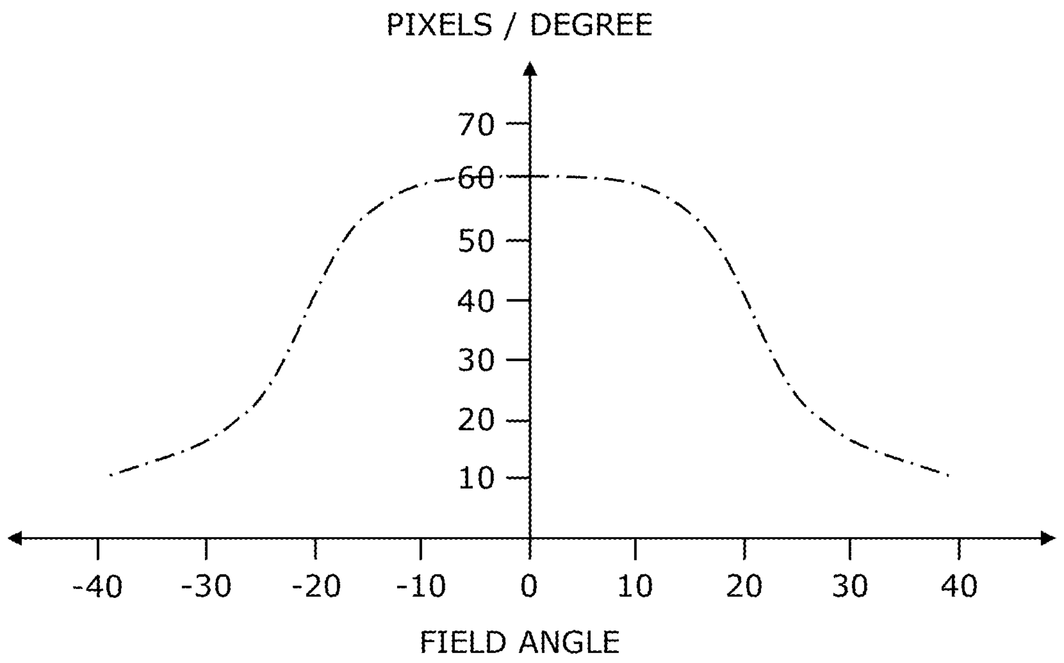
FIG. 1C illustrates an exemplary graphical representation of a variation of an angular resolution of said camera as a function of the angular width of the FOV of said camera.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

a first camera and a second camera that are to be employed to simultaneously capture a first image and a second image, respectively, wherein an illumination parameter varies spatially across a first field of view (FOV) of the first camera, and across a second FOV of the second camera, the illumination parameter being any one of:

(i) a ratio of a per-pixel area (A) to pixels per degree (PPD), (ii) a ratio of a multiplication product of the per-pixel area and a relative illumination (A×RI) to the PPD; and at least one processor configured to:

detect whether the first camera has a first value of the illumination parameter in at least one first region of the first FOV, while the second camera has, in at least one corresponding region of the second FOV, a second value of the illumination parameter that is greater than the first value; and when it is detected that the first camera has the first value of the illumination parameter in the at least one first region, while the second camera has the second value of the illumination parameter that is greater than the first value in the at least one corresponding region, apply a denoising technique on at least one first image segment of the first image that represents the at least one first region of the first FOV, based on at least one corresponding image segment of the second image that represents the at least one corresponding region of the second FOV.

In a second aspect, an embodiment of the present disclosure provides a method comprising:

detecting whether a first camera has a first value of an illumination parameter in at least one first region of a first field of view (FOV) of the first camera, while a second camera has, in at least one corresponding region of a second FOV of the second camera, a second value of the illumination parameter that is greater than the first value, wherein the first camera and the second camera are to be employed to simultaneously capture a first image and a second image, respectively, and wherein the illumination parameter varies spatially across the first FOV and the second FOV, the illumination parameter being any one of:

(i) a ratio of a per-pixel area (A) to pixels per degree (PPD), (ii) a ratio of a multiplication product of the per-pixel area and a relative illumination (A×RI) to the PPD; and when it is detected that the first camera has the first value of the illumination parameter in the at least one first region, while the second camera has the second value of the illumination parameter that is greater than the first value in the at least one corresponding region, applying a denoising technique on at least one first image segment of the first image that represents the at least one first region of the first FOV, based on at least one corresponding image segment of the second image that represents the at least one corresponding region of the second FOV.

The present disclosure provides the aforementioned imaging system and the aforementioned method incorporating denoising in multi-camera systems to generate high-resolution, blur-free, denoised images, in computationally-efficient and time-efficient manner. Herein, since the at least one first region and the at least one corresponding region represent a same object (or its portion), when the second value of illumination parameter is greater than the first value of the illumination parameter, the same object (or its portion) would be captured (namely, represented) with some noise but at a relatively higher resolution by the first camera, whereas the same object (or its portion) would be captured with very minimal/no noise but at a lower resolution by the second camera. In such a case, the at least one first image segment of the first image would represent the same object or its portion with a low brightness and a high noise (but potentially without any blurriness). On the other hand, the at least one corresponding image segment of the second image would represent the same object or its portion with a high brightness and no noise (but potentially with some blurriness). Therefore, the at least one corresponding image segment is utilised to denoise the at least one first image segment accordingly. Beneficially, upon performing the denoising technique, the same object (or its portion) represented by the at least one first image segment would appear to be noise-free, sharp (i.e., in-focus) and considerably bright. In this way, an image quality of the first image is significantly improved, for example, in terms of a uniform brightness, a high resolution, a minimal noise/blur, and the like. Moreover, a viewing experience of a user would become highly immersive and realistic, when the first image is subsequently shown to said user. It will be appreciated that such a denoising can be beneficially performed in the aforesaid manner irrespective of whether the first camera and the second camera form a stereo pair or not, and may employ a same setting pertaining to at least one of: an exposure time, a sensitivity, an aperture size, for capturing the first image and the second image.

The imaging system and the method are susceptible to cope with visual quality requirements in extended-reality (XR) devices, for example, such as a high resolution (for example, such as a resolution higher than or equal to 60 pixels per degree), a small pixel size, and a large field of view, whilst achieving a high frame rate (for example, such as a frame rate higher than or equal to 90 FPS). The imaging system and the method are simple, robust, fast, reliable, and can be implemented with ease.

Throughout the present disclosure, the term "camera" refers to an equipment that is operable to detect and process light signals received from a real-world environment, so as to capture image(s) of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as a stereo camera. The term "given camera" encompasses at least the first camera and/or the second camera. Cameras are well-known in the art.

It will be appreciated that a given image is a visual representation of the real-world environment. The term "visual representation" encompasses colour information represented in the given image, and additionally optionally other attributes associated with the given image (for example, such as depth information, brightness information, luminance information, transparency information (namely, alpha values), polarization information, and the like). Optionally, the colour information represented in the given image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values. The term "given image" encompasses at least the first image and/or the second image.

It will also be appreciated that the first image and the second image represent a same real-world region of the real-world environment, but are slightly offset with respect to each other, owing to slightly different FOVs being captured in the first image and the second image. Moreover, the first FOV of the first camera at least partially overlaps with the second FOV of the second camera. This means that an overlapping FOV between the first camera and the second camera represents a portion of the same real-world region that lies in both the first FOV and the second FOV, thus objects or their portions present in said portion would be captured both by the first camera and the second camera. An object could be a living object (for example, such as a human, a pet, a plant, and the like) or a non-living object (for example, such as a wall, a window, a toy, a poster, a lamp, and the like).

Optionally, the first camera and the second camera form a stereo pair. In this regard, the first image is captured from a perspective of one of a left eye and a right eye, whereas the second image is captured from a perspective of another of the left eye and the right eye. Thus, the first camera and the second camera may be arranged to face the real-world environment in a manner that a distance between them is equal to an interpupillary distance (IPD) between the left eye and the right eye. In an example, the IPD may be an average IPD. Alternatively, optionally, the first camera and the second camera do not form a stereo pair. In this regard, both the first camera and the second camera could, for example, be employed to capture images from a perspective of a same eye (for example, either a right eye or a left eye). This may particularly be beneficial when a quad camera system is to be employed. It will be appreciated that the first camera and the single second camera need not necessarily be arranged in a side-by-side manner (like in case of the stereo pair), but could also be arranged in a top-to-bottom manner or in a diagonal manner. It will be appreciated that the first camera and the second camera may be identical in terms of their construction and working, and may capture the first image and the second image, respectively, using a same setting pertaining to at least one of: an exposure time, a sensitivity, an aperture size.

Throughout the present disclosure, the term "illumination parameter" of a given camera refers to a metric that is indicative of an amount of illumination (namely, a light intensity or brightness) received at a given part of an image sensor of a given camera. Greater the value of the illumination parameter in the given part of the image sensor, greater is the illumination received at the given part of the image sensor and greater is the brightness of a corresponding image segment of an image that is captured by the given part of the image sensor, and vice versa. It will be appreciated that when the illumination parameter varies spatially across said FOV of the given camera, it means that different regions of the image captured by the given camera would have different levels of brightness or light intensity, based on positions of the different regions. In other words, some regions of the image may appear to be relatively bright, while other regions of the image may appear to be relatively dim. The illumination parameter may vary differently for different cameras based on their optics.

It will be appreciated that when the illumination parameter is defined according to (i), and when the per-pixel area is same (i.e., fixed) for a given camera, the illumination parameter would be inversely related to the PPD (namely, an angular resolution of the given camera). Greater the PPD of a given region in a given FOV of the given camera, lesser is the value of the illumination parameter in the given region of the given FOV, and vice versa. This is due to the fact that for a high PPD, a same amount of light would incident towards (namely, would be distributed amongst) a greater number of pixels of an image sensor, as compared to that for a lower PPD. In other words, the PPD is indirectly related to a light receiving capability of pixels of the image sensor. Greater the PPD, greater is the probability of capturing a given region of a given image with noise and less brightness, and vice versa. Furthermore, when the PPD is fixed for the first camera and the second camera (i.e., when both the first camera and the second camera have a same angular resolution), the illumination parameter would be directly related to the per-pixel area. Greater the per-pixel area, greater is the value of the illumination parameter for the given camera, and vice versa. This is due to the fact that the per-pixel area is directly related to the light receiving capability of pixels of the image sensor. Determination of the illumination parameter according to (i) is applicable for both cases when the per-pixel area is the same for the first camera and the second camera, as well as when the per-pixel area is different for the first camera and the second camera. Moreover, when optics of the first camera and optics of the second camera are different, the relative illumination can also be taken into account for determining the illumination parameter, as described in (ii). When the PPD and the per-pixel area are fixed for the first camera and the second camera, the illumination parameter would be directly related to the relative illumination. Greater the relative illumination of a given region in a given FOV of the given camera, greater is the value of the illumination parameter in the given region of the given FOV, and vice versa. The term "relative illumination" refers to a level of illumination for a given region in a given FOV of the given camera with respect to a maximum level of illumination present anywhere across the given FOV. Typically, the relative illumination varies spatially across the given FOV of the given camera in a manner that the relative illumination is highest at a central region of the given FOV and decreases on going away from the central region towards a peripheral region of the given FOV, the central region being surrounded by the peripheral region. The relative illumination may be expressed in terms of percentage, for example, lying in a range of 0 to 100, wherein 0 indicates no light (i.e., darkness) and 100 indicates a maximum brightness. The relative illumination could occur due to optical characteristics of optics of the given camera, for example, such as shading, vignetting, anti-reflection coatings of said optics, angles of incidence of light (namely, chief ray angles and marginal ray angles), materials and surface properties of said optics, and the like. Moreover, the relative illumination could also be affected due to total internal reflection (TIR) which usually occurs at optical surfaces of the optics. The TIR occurs twice for each lens in an optical system when light strikes a surface of said lens at an angle greater than a critical angle, thereby resulting into its total reflection. Thus, this phenomenon of light reflection due to the TIR may influence an overall illumination uniformity within the optical system. Angles of incidence inside said lens may be large, thereby contributing more to the TIR. Moreover, vignetting inside the lens may also contribute to relative illumination. This is applicable to micro lens arrays as well. Different cameras may have different optical characteristics and thus different variations of relative illumination across their respective FOVs. The multiplication product of the per-pixel area and the relative illumination could be referred to as a photon-to-signal conversion efficiency of the given camera. The per-pixel area, the PPD, and the relative illumination are well-known in the art. The term "given FOV" encompasses at least the first FOV and/or the second FOV.

Since the per-pixel area (which is usually fixed), the PPD, and the relative illumination for the given camera are already accurately known to the at least one processor, the at least one processor can easily detect values of the illumination parameter in different regions of the given FOV, for example, by employing at least one mathematical technique. In an example, the at least one processor may employ a look-up table for detecting the values of the illumination parameter in the different regions of the given FOV. It will be appreciated that when detecting the first value of the illumination parameter, the at least one processor takes into account a position of the at least one first region within the first FOV. Similarly, when detecting the second value of the illumination parameter, the at least one processor takes into account a position of the at least one corresponding region within the second FOV. This is because when a same object (or its portion) is present in the first FOV as well as in the second FOV (namely, in the overlapping FOV), a position of the same object would be different in the first FOV and the second FOV. Thus, positions of respective regions within the first FOV and the second FOV corresponding to the same object would also be different. Since the illumination parameter varies spatially across the first FOV and the second FOV, the at least one first region could be at a position within the first FOV for which a value of the illumination parameter in the at least one first region is low, whereas the at least one corresponding region could be at a position for which a value of the illumination parameter in the at least one corresponding region is high, or vice versa. For example, the illumination parameter vary spatially across the given FOV (namely, both the first FOV and the second FOV) in a manner that a value of the illumination parameter may be low towards a central region of the given FOV, then increases on going away from the central region towards a peripheral region of the given FOV to reach a maximum value, and then decreases, the central region being surrounded by the peripheral region. In such a case, for the second value of the illumination parameter to be greater than the first value of the illumination parameter, the at least one first region may be the central region and the at least one corresponding region may be any region (such as a left-side region, a right-side region, or the like) within the peripheral region. It is to be understood that the at least one corresponding region corresponds to the at least one first region.

Further, since the at least one first region and the at least one corresponding region correspond to the same object (or its portion), when the second value is greater than the first value, it means that the same object or its portion would be captured with noise but at a high resolution by the first camera, whereas the same object or its portion would be captured with very minimal/no noise but at a low resolution by the second camera. In such a case, the at least one first image segment of the first image would represent the same object or its portion with a low brightness and a high noise (but without any blurriness). On the other hand, the at least one corresponding image segment of the second image would represent the same object or its portion with a high brightness and no noise (but with blurriness). Therefore, the at least one processor beneficially utilises (pixel values of pixels in) the at least one corresponding image segment in order to correct (pixel values of pixels in) the at least one first image segment, and performs the denoising technique on the at least one first image segment accordingly. For performing the denoising technique, the first image may be considered to be a target image (that needs to be corrected), whereas the second image may be considered to be a guide image or a supervising image (based on which the target image is to be corrected). Beneficially, upon performing the denoising technique, the same object (or its portion) represented by the at least one first image segment would appear to be noise-free, sharp (i.e., in-focus) and considerably bright. In this way, an image quality of the first image is significantly improved, for example, in terms of a uniform brightness, a high resolution, a minimal noise/blur, and the like. Moreover, a viewing experience of a user would become highly immersive and realistic, when the first image is subsequently shown to said user. It is to be understood that the at least one first image segment comprises at least some pixels from amongst a plurality of pixels in the first image, while the at least one corresponding image segment comprises at least some pixels from amongst a plurality of pixels in the second image. Optionally, the at least one first region and/or the at least one corresponding region of the second image has an angular width that lies in a range of 5 degrees to 45 degrees or optionally, in a range of 5 degrees to 60 degrees. It will be appreciated that the term "pixel value" of a pixel encompasses not only colour information to be represented by a pixel, but also other attributes associated with said pixel (for example, such as depth information, brightness information, transparency information (namely, alpha values), luminance information, polarisation information, and the like). Pixel values are well-known in the art.

The "denoising technique" is an image processing technique for removing noise from a noise-contaminated image. When any image is denoised, it means that noise in said image is removed, for example, to some extent. Optionally, the denoising technique is applied using at least one of: a bilateral filter, a trilateral filter, a guided filter, at least one neural network. The denoising technique and its application are well-known in the art. One way of using the guided filter for applying the denoising technique is described, for example, in "*Guided Image Filtering*" by Kaiming He et al., in IEEE Transactions on Pattern Analysis and Machine Intelligence, Vol. 35, Issue 6, pp. 1397-1409, 2013. It will be appreciated that a neural network-based denoising technique may be simply based on a same principle of a guided image filtering, but instead of employing fixed mathematical filters, said neural network-based denoising technique could employ deep learning algorithms. Furthermore, as the first image and the second image are captured from different poses of the first camera and the second camera, respectively, a viewpoint and a viewing direction of the first camera would be different from a viewpoint and a viewing direction of the second camera. Resultantly, there would always be some offset/skewness between the first image and the second image. Optionally, in such a case, prior to applying the denoising technique and utilising the at least one corresponding image segment of the second image, the at least one processor is configured to reproject the second image in order to match the at least one corresponding image segment upon reprojection with the at least one first image segment, based on a difference between a pose of the first camera from perspective of which the first image is captured and a pose of the second camera from perspective of which the second image is captured. Optionally, in this regard, the at least one processor is configured to employ at least one image reprojection algorithm. Image reprojection algorithms are well-known in the art.

Optionally, the at least one processor is configured to perform the denoising technique only when the second value of the illumination parameter is greater than the first value of the illumination parameter by at least a predefined threshold. In other words, when the first value and the second value are significantly different, it would be highly beneficial to perform the aforesaid denoising technique; otherwise when the first value is closely similar to the second value, there may not be any considerable change in an image quality of the at least one first image segment of the first image upon denoising. Optionally, the predefined threshold lies in a range of 5 percent to 10 percent of any one of: the first value, the second value. It will be appreciated that the predefined threshold depends on the illumination parameter (namely, whether (i) A/PPD or (ii) (A×RI)/PPD is employed as the illumination parameter).

Optionally, the at least one processor is configured to apply at least one image restoration technique on the at least one corresponding image segment of the second image, based on the at least one first image segment of the first image, when it is detected that the first camera has the first value of the illumination parameter in the at least one first region, while the second camera has the second value of the illumination parameter that is greater than the first value in the at least one corresponding region. In this regard, since the at least one first image segment has a higher resolution as compared to the at least one corresponding image segment, and thus would represent the same object or its portion without any blurriness (but with noise), as compared to the at least one corresponding image segment that represent the same object or its portion with blurriness (but no noise) as discussed earlier, the at least one processor can utilise (pixel values of pixels in) the at least one first image segment in order to correct (pixel values of pixels in) the at least one corresponding image segment, and performs the at least one image restoration technique on the at least one corresponding image segment accordingly. For performing the at least one image restoration technique, the second image may be considered to be a target image (that needs to be corrected), whereas the first image may be considered to be a guide image or a supervising image (based on which the target image is to be corrected).

The "image restoration technique" is an image processing technique for improving a visual quality and clarity of an image that has been degraded due to various factors, for example, such as blurring, distortion, and the like. Optionally, the at least one image restoration technique comprises at least one of: an image de-blurring technique, an image sharpening technique, a contrast enhancement technique, an edge enhancement technique, a super-resolution technique. The "image de-blurring technique" is an image processing technique for correcting (namely, removing or reducing) blurriness present in a given image. Such a blurriness may be caused due to a motion blur, a camera shake, a defocus blur, an atmospheric condition, and the like. The image de-blurring technique may be based on one of: blind image deconvolution, non-blind image deconvolution. The "image sharpening technique" is an image processing technique for increasing an apparent sharpness of (a visual content represented in) a given image. The image sharpening technique may, for example, be an unsharp masking (UM) technique, a wavelet transform-based image sharpening technique, or similar. The "contrast enhancement technique" is an image processing technique for adjusting a relative brightness and darkness of objects or their portions represented in a given image, in order to improve their visibility in the given image. The contrast enhancement technique may, for example, be a histogram equalization technique, a gamma correction technique, a tone-mapping technique, a high dynamic range (HDR) tone-mapping technique, or similar. The "edge enhancement technique" is an image processing technique for enhancing an edge contrast of features represented in a given image in order to improve an acutance of the given image. The edge enhancement technique may, for example, be a linear edge enhancement technique, a non-linear edge enhancement technique, or similar. The "super-resolution technique" is an image restoration technique that enhances a resolution of a given portion of an image, wherein the given portion with the super-resolution technique applied thereon has a higher pixel count as compared to an original pixel count without the super-resolution technique. All the aforesaid techniques are well-known in the art.

Beneficially, upon performing the at least one image restoration technique, the same object (or its portion) represented by the at least one corresponding image segment would appear to be sharp (i.e., in-focus) and blur-free, and has a high contrast. In this way, an image quality of the second image is significantly improved, for example, in terms of a uniform sharpness, a high resolution, a minimal noise/blur, and the like. Moreover, a viewing experience of a user would become highly immersive and realistic, when the second image is subsequently shown to said user.

Optionally, the at least one processor is configured to:

detect whether the second camera has a third value of the illumination parameter in at least one second region of the second FOV, while the first camera has, in at least one corresponding region of the first FOV, a fourth value of the illumination parameter that is greater than the third value; and when it is detected that the second camera has the third value of the illumination parameter in the at least one second region, while the first camera has the fourth value of the illumination parameter that is greater than the third value in the at least one corresponding region, apply the denoising technique on at least one second image segment of the second image that represents the at least one second region of the second FOV, based on at least one corresponding image segment of the first image that represents the at least one corresponding region of the first FOV.

In this regard, the aforementioned operations are beneficial to be performed by the at least one processor for the second camera as well, when the first camera and the second camera form the stereo pair. This is because in addition to a scenario discussed earlier with respect to the first camera, there could also be a scenario (with respect to the second camera) in which the at least one second region of the second FOV and the at least one corresponding region of the first FOV correspond to a same object (or its portion), and when the fourth value is greater than the third value, it means that the same object or its portion would be captured with noise but at a high resolution by the second camera, whereas the same object or its portion would be captured with very minimal/no noise but at a low resolution by the first camera. In such a case, the at least one second image segment of the second image would represent the same object or its portion with a low brightness and a high noise (but without any blurriness). On the other hand, the at least one corresponding image segment of the first image would represent the same object or its portion with a high brightness and no noise (but with blurriness). Therefore, the at least one processor beneficially utilises (pixel values of pixels in) the at least one corresponding image segment in order to correct (pixel values of pixels in) the at least one second image segment, and performs the denoising technique on the at least one second image segment accordingly, in a similar manner as described earlier. For performing the aforesaid denoising technique, the second image may be considered to be a target image (that needs to be corrected), whereas the first image may be considered to be a guide image or a supervising image (based on which the target image is to be corrected). The technical benefit of performing the denoising technique for both the first camera and the second camera is that a combined view of the first image and the second image would have a high and a uniform visual detail (for example, in terms of high resolution, high brightness, minimal/no blur, minimal/no noise, and the like) throughout a wide field of view. In this way, a viewing experience of the user is greatly enhanced, when the combined view of the first image and the second image is shown to the user.

Optionally, prior to applying the denoising technique and utilising the at least one corresponding image segment of the first image, the at least one processor is configured to reproject the first image in order to match the at least one corresponding image segment upon reprojection with the at least one second image segment, based on the aforesaid difference between poses of the first camera and the second camera. It is to be understood that the at least one second image segment comprises at least some pixels from amongst a plurality of pixels in the second image, while the at least one corresponding image segment comprises at least some pixels from amongst a plurality of pixels in the first image. Optionally, the at least one second region and/or the at least one corresponding region of the first image has an angular width that lies in a range of 5 degrees to 45 degrees or optionally, in a range of 5 degrees to 60 degrees.

Optionally, the at least one processor is configured to apply at least one image restoration technique on the at least one corresponding image segment of the first image, based on the at least one second image segment of the second image, when it is detected that the second camera has the third value of the illumination parameter in the at least one second region, while the first camera has the fourth value of the illumination parameter that is greater than the third value in the at least one corresponding region. In this regard, since the at least one second image segment has a higher resolution as compared to the at least one corresponding image segment of the first, and thus would represent the same object or its portion without any blurriness (but with noise), as compared to the at least one corresponding image segment of the first image that represent the same object or its portion with blurriness (but no noise) as discussed earlier, the at least one processor can utilise (pixel values of pixels in) the at least one second image segment in order to correct (pixel values of pixels in) the at least one corresponding image segment of the first image, and performs the at least one image restoration technique on the at least one corresponding image segment accordingly, in a similar manner as discussed earlier. For performing the at least one image restoration technique, the first image may be considered to be a target image (that needs to be corrected), whereas the second image may be considered to be a guide image or a supervising image (based on which the target image is to be corrected). Beneficially, upon performing the at least one image restoration technique, the same object (or its portion) represented by the at least one corresponding image segment of the first image would appear to be sharp (i.e., in-focus) and blur-free, and has a high contrast. It will be appreciated that the aforementioned operation is beneficial to be performed by the at least one processor when the first camera and the second camera form the stereo pair. The technical benefit of performing the at least one image restoration technique for both the first camera and the second camera is that a combined view of the first image and the second image would have a high and a uniform/improved visual detail throughout the wide field of view, as described earlier.

In an embodiment, the at least one processor is configured to:

obtain information indicative of a first gaze direction of a first eye;

determine a gaze region within the first FOV, based on the first gaze direction; and select the at least one first region of the first FOV, based on the gaze region within the first FOV, wherein the at least one first region includes and surrounds the gaze region.

Optionally, the at least one processor is configured to obtain, from a client device, information indicative of a given gaze direction of a given eye. The client device could, for example, be implemented as a head-mounted display (HMD) device. Optionally, the client device comprises gaze-tracking means. The term "gaze direction" refers to a direction in which the given eye is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialized equipment for detecting and/or following a gaze of a given eye of a user. The gaze-tracking means could be implemented as contact lenses with sensors, cameras monitoring a position, a size and/or a shape of a pupil of the user's eye, and the like. Such gaze-tracking means are well-known in the art. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the given gaze direction from the client device. Alternatively, when the imaging system is integrated into the client device, the at least one processor obtains the information indicative of the given gaze direction from the gaze-tracking means of the client device.

Optionally, the given gaze direction is a current gaze direction. Alternatively, optionally, the given gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the given gaze direction is a default gaze direction, wherein the default gaze direction is straight towards a centre of a field of view of the user. In this regard, it is considered that the user's gaze is, by default, typically directed towards the centre of his/her field of view. In such a case, a central region of a field of view of the user is resolved to a much greater degree of visual detail, as compared to a remaining, peripheral region of the field of view of the user.

Optionally, when determining the gaze region within the first FOV, the at least one processor is configured to map the first gaze direction of the first eye onto the first FOV. The term "gaze region" refers to a region in a given FOV of a given camera onto which the given gaze direction is mapped. The gaze region could, for example, be at a centre of the given FOV, be a top-left region of the given FOV, a bottom-right region of the given FOV, or similar. It will be appreciated that as the user's gaze keeps changing, the at least one first region of the first FOV is selected dynamically based on the gaze region. Such a dynamic manner of selecting the at least one first region emulates a way in which the user actively focuses within his/her field of view.

Optionally, when the at least one first region is selected based on the gaze region, the at least one processor is configured to apply the denoising technique on the at least one first image segment that corresponds to the gaze region, instead of applying the denoising technique on any other (non-gaze-contingent) image segment of the first image. This is because objects or their portions lying within the gaze region are gaze-contingent objects, and such objects are focussed onto foveae of user's eyes, and are resolved to a much greater detail as compared to remaining non-gaze-contingent object(s) which lie outside the gaze region. Therefore, it would be beneficial to apply the denoising technique on the at least one first image segment that corresponds to the gaze region. In this way, the gaze-contingent objects represented by the at least one first image segment would appear to be noise-free (i.e., clearly and accurately visible in the first image).

In another embodiment, the at least one processor is configured to:

- obtain information indicative of a first gaze direction of a first eye;
- determine a gaze region within the first FOV, based on the first gaze direction; and
- select the at least one first region of the first FOV, based on the gaze region within the first FOV, wherein the at least one first region is a peripheral region that surrounds the gaze region.

In this regard, when the peripheral region surrounds the gaze region, the peripheral region (namely, the at least one first region) is a non-gaze-contingent region of the first FOV. Optionally, the at least one processor is configured to apply the denoising technique on the at least one first image segment that corresponds to the peripheral region (that does not include the gaze region). The technical benefit of applying the denoising technique on the at least one first image segment that corresponds to the peripheral region is that when the first image (upon its generation) is presented to the user, the user would not perceive any flicker or jerk in the at least one first image segment. This is because denoising facilitates in reducing flicker or jerk without compromising any visual fidelity of an image. In this way, a viewing experience of the user would become more immersive and realistic.

Moreover, in an embodiment, the at least one processor is configured to:

- identify at least one salient feature in the first image;
- identify at least one image segment of the first image that includes the at least one salient feature; and
- select the at least one first region of the first FOV as at least one region of the first FOV that corresponds to the at least one image segment of the first image.

Herein, the term "salient feature" refers to a feature in a given image that is visually alluring (namely, has high saliency). Examples of the at least one salient feature may include, but are not limited to, an edge, a corner, and a high-frequency texture detail. Optionally, when identifying at least one salient feature in the given image, the at least one processor is configured to employ at least one feature-extraction algorithm. Examples of the at least one feature extraction algorithm include, but are not limited to, an edge-detection algorithm (for example, such as a biased Sobel gradient estimator, a Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as Scale-Invariant Feature Transform (SIFT), Oriented FAST and rotated BRIEF (ORB), Speeded Up Robust Features (SURF), and the like). Such feature-extraction algorithms are well-known in the art. The at least one processor could also employ a neural network-based approach for identifying the at least one salient feature in the given image. Once the at least one salient feature is identified in the given image, the at least one image segment of the given image that includes the at least one salient feature can be easily and accurately identified by the at least one processor. It is to be understood that the at least one image segment of the first image would correspond to the at least one first image segment that represents the at least one first region.

It will be appreciated that since the at least one salient feature is visually alluring, the user is more likely to focus on the at least one salient feature as compared to other features in the given image. Therefore, the at least one salient feature should be represented with high visual quality (for example, in terms of a high resolution, a high brightness, minimal/no noise and blur, and the like) in the given image. For example, the user is more likely to focus on edges, corners, or high-frequency texture details as compared to interior features, blobs, or low-frequency texture details, since the former types of features are more visually alluring as compared to the latter types of features. Therefore, the at least one processor is configured to apply the denoising technique on the at least one first image segment that corresponds to the at least one salient feature, so as to obtain a high visual quality of the at least one salient feature in the first image.

It will be appreciated that the aforesaid embodiments have been described with respect to the first eye only. Thus, the at least one processor is optionally configured to perform same operations (as mentioned in the aforesaid embodiments) with respect to a second eye also, as discussed hereinbelow.

In an embodiment, the at least one processor is configured to:

- obtain information indicative of a second gaze direction of a second eye;
- determine a gaze region within the second FOV, based on the second gaze direction; and
- select the at least one second region of the second FOV, based on the gaze region within the second FOV, wherein the at least one second region includes and surrounds the gaze region.

In another embodiment, the at least one processor is configured to:

- obtain information indicative of a second gaze direction of a second eye;
- determine a gaze region within the second FOV, based on the second gaze direction; and
- select the at least one second region of the second FOV, based on the gaze region within the second FOV, wherein the at least one second region is a peripheral region that surrounds the gaze region.

In an embodiment, the at least one processor is configured to:

- identify at least one salient feature in the second image;
- identify at least one image segment of the second image that includes the at least one salient feature; and
- select the at least one second region of the second FOV as at least one region of the second FOV that corresponds to the at least one image segment of the second image.

Moreover, optionally, the imaging system further comprises at least one third camera that is to be employed to capture at least one third image simultaneously with the first image and the second image, wherein the illumination parameter varies spatially across at least one third FOV of the at least one third camera, wherein the at least one processor is configured to:

- detect when a region of interest within a given FOV, from amongst the first FOV, the second FOV and the at least one third FOV, has a value of the illumination parameter that is smaller than a first predefined threshold or is smaller than at least one of individual values of the illumination parameter in corresponding regions of a remainder of the first FOV, the second FOV and the at least one third FOV by at least a second predefined threshold;
- calculate respectively differences between the value of the illumination parameter in the region of interest of the given FOV and the individual values of the illumination parameter in the corresponding regions of the remainder of the first FOV, the second FOV and the at least one third FOV;
- determine one of the remainder whose difference is largest amongst the calculated differences; and
- apply the denoising technique on an image segment of a given image that represents the region of interest of the given FOV, based on a corresponding image segment of another image that represents a corresponding region of the determined one of the remainder, wherein the given image corresponds to the given FOV, while the another image corresponds to the determined one of the remainder.

In this regard, the term "region of interest" refers to any region within the given FOV whereat the user is looking or is going to look. Optionally, the at least one processor is configured to determine the region of interest, based on user's gaze. The region of interest could have visual representation that is more noticeable and prominent as compared to visual representation in remaining region(s) of the given FOV. In order to determine whether it would be beneficial to apply the denoising technique on the image segment of the given image that represents the region of interest in a multi-camera case, the value of the illumination parameter is detected in the region of interest, and compared with the first predefined threshold. When said value is smaller than the first predefined threshold, it would be beneficial to apply the denoising technique and subsequent operations would then be performed. Moreover, instead of such a comparison, it could be alternatively determined how much the value of the illumination parameter varies as compared to at least one of the individual values of the illumination parameter in the corresponding regions of the remainder, according to the second predefined threshold. In other words, when there is a significant difference between the value of the illumination parameter in the region of interest and at least one of the individual values of the illumination parameter (namely, when values of the illumination parameter in the region of interest and the corresponding regions are not closely similar), it would be beneficial to apply the denoising technique and the subsequent operations would be performed. It will be appreciated that the first predefined threshold and the second predefined threshold depends on the illumination parameter (namely, whether (i) A/PPD or (ii) (A×RI)/PPD is employed as the illumination parameter). In an example, when a difference between the value of the illumination parameter in the region of interest and at least one of the individual values of the illumination parameter is equal to F-stop difference that is equal to 0.05, it would be beneficial to apply the denoising technique. Optionally, the second predefined threshold lies in a range of 5 percent to 10 percent of the value of the illumination parameter in the region of interest of the given FOV.

Optionally, when determining the one of the remainder, the at least one processor is configured to: employ at least one mathematical operation to calculate the respective differences; and compare the respective differences amongst each other to determine a largest difference; select the one of the remainder with which the largest difference is determined. The technical benefit of determining the one of the remainder whose difference is largest and employing it as a guide image or a supervising image for denoising the image segment of the given image is that a same object (or its portion) present in the corresponding region (that corresponds to the region of interest) would be captured with least noise but at a low resolution in the another image. Thus, the corresponding image segment of the another image would represent such an object or its portion with a high brightness and least noise (but with blurriness), as compared to the image segment of the given image. Therefore, it would be beneficial to utilise (pixel values of pixels in) the corresponding image segment in order to correct (pixel values of pixels in) the image segment, and performs the denoising technique on the at image segment accordingly, in a similar manner as discussed earlier.

Optionally, the at least one processor is configured to:

detect when a difference between a value of the illumination parameter of a given region of the first FOV and another value of the illumination parameter of a corresponding region of the second FOV is smaller than a third predefined threshold; and when it is detected that the difference is smaller than the third predefined threshold, apply at least one of: another denoising technique, at least one image restoration technique on at least one of:

(a) a given image segment of the first image that represents the given region of the first FOV, based on a corresponding image segment of the second image that represents the corresponding region of the second FOV, (b) the corresponding image segment of the second image that represents the corresponding region of the second FOV, based on the given image segment of the first image that represents the given region of the first FOV.

In this regard, when the difference between the value of the illumination parameter of the given region and the another value of the illumination parameter of the corresponding region is smaller than the third predefined threshold, it means that both the aforesaid values are closely similar to each other. In such a case, both the given image segment of the first image and the corresponding image segment of the second image would have almost similar visual details, for example, in terms of brightness, resolution, contrast, blur, noise, and the like. Therefore, the another denoising technique and/or the at least one image restoration technique could be applied for one of the first image and the second image or for both of the first image and the second image. The technical benefit of applying either or both of the aforesaid techniques (namely, the another denoising technique, the at least one image restoration technique) on both the first image and the second image is that the first image and the second image would become completely identical to each other (for example, in terms of brightness, noise, blur, or similar) upon the aforesaid application. This may, for example, be beneficial in a scenario in which a combined view of the first image and the second image is to be shown to the user. Moreover, this also facilitates in improving colour fidelity and overall image quality of such images, by reducing abrupt variations/shifts, both over time (frame to frame) and across different colour channels of said images, thereby resulting in a smooth and visually appealing viewing experience.

Optionally, when applying the another denoising technique and/or the at least one image restoration technique on the given image segment of the first image, the at least one processor is configured to utilise pixel values of pixels in the corresponding image segment of the second image in order to correct pixel values of pixels in the given image segment. Similarly, when applying the another denoising technique and/or the at least one image restoration technique on the corresponding image segment of the second image, the at least one processor is configured to utilise pixel values of pixels in the given image segment of the first image in order to correct pixel values of pixels in the corresponding image segment of the second image. In example, the another denoising technique could be a multi-frame type of denoising technique, wherein the at least one processor is configured to perform averaging of the pixel values of pixels in the corresponding image segment and the pixel values of pixels in the given image segment. Optionally, the third predefined threshold lies in a range of 5 percent to 10 percent of any one of: the value of the illumination parameter of the given region of the first FOV or the another value of the illumination parameter of the corresponding region of the second FOV.

The present disclosure also relates to the method as described above. Various embodiments and variants disclosed above, with respect to the aforementioned imaging system, apply mutatis mutandis to the method.

Optionally, the method further comprises applying at least one image restoration technique on the at least one corresponding image segment of the second image, based on the at least one first image segment of the first image, when it is detected that the first camera has the first value of the illumination parameter in the at least one first region, while the second camera has the second value of the illumination parameter that is greater than the first value in the at least one corresponding region.

Optionally, the method further comprises:

detecting whether the second camera has a third value of the illumination parameter in at least one second region of the second FOV, while the first camera has, in at least one corresponding region of the first FOV, a fourth value of the illumination parameter that is greater than the third value; and when it is detected that the second camera has the third value of the illumination parameter in the at least one second region, while the first camera has the fourth value of the illumination parameter that is greater than the third value in the at least one corresponding region, applying the denoising technique on at least one second image segment of the second image that represents the at least one second region of the second FOV, based on at least one corresponding image segment of the first image that represents the at least one corresponding region of the first FOV.

Optionally, the method further comprises applying at least one image restoration technique on the at least one corresponding image segment of the first image, based on the at least one second image segment of the second image, when it is detected that the second camera has the third value of the illumination parameter in the at least one second region, while the first camera has the fourth value of the illumination parameter that is greater than the third value in the at least one corresponding region.

In an embodiment, the method further comprises:

obtaining information indicative of a first gaze direction of a first eye;

determining a gaze region within the first FOV, based on the first gaze direction; and selecting the at least one first region of the first FOV, based on the gaze region within the first FOV, wherein the at least one first region includes and surrounds the gaze region.

In another embodiment, the method further comprises:

obtaining information indicative of a first gaze direction of a first eye;

determining a gaze region within the first FOV, based on the first gaze direction; and selecting the at least one first region of the first FOV, based on the gaze region within the first FOV, wherein the at least one first region is a peripheral region that surrounds the gaze region.

In an embodiment, the method further comprises:

identifying at least one salient feature in the first image;

identifying at least one image segment of the first image that includes the at least one salient feature; and selecting the at least one first region of the first FOV as at least one region of the first FOV that corresponds to the at least one image segment of the first image.

Optionally, at least one third camera is to be employed to capture at least one third image simultaneously with the first image and the second image, wherein the illumination parameter varies spatially across at least one third FOV of the at least one third camera, wherein the method further comprises:

detecting when a region of interest within a given FOV, from amongst the first FOV, the second FOV and the at least one third FOV, has a value of the illumination parameter that is smaller than a first predefined threshold or is smaller than at least one of individual values of the illumination parameter in corresponding regions of a remainder of the first FOV, the second FOV and the at least one third FOV by at least a second predefined threshold;

calculating respectively differences between the value of the illumination parameter in the region of interest of the given FOV and the individual values of the illumination parameter in the corresponding regions of the remainder of the first FOV, the second FOV and the at least one third FOV;

determining one of the remainder whose difference is largest amongst the calculated differences; and applying the denoising technique on an image segment of a given image that represents the region of interest of the given FOV, based on a corresponding image segment of another image that represents a corresponding region of the determined one of the remainder, wherein the given image corresponds to the given FOV, while the another image corresponds to the determined one of the remainder.

Optionally, the method further comprises:

detecting when a difference between a value of the illumination parameter of a given region of the first FOV and another value of the illumination parameter of a corresponding region of the second FOV is smaller than a third predefined threshold; and when it is detected that the difference is smaller than the third predefined threshold, applying at least one of: another denoising technique, at least one image restoration technique on at least one of:

(a) a given image segment of the first image that represents the given region of the first FOV, based on a corresponding image segment of the second image that represents the corresponding region of the second FOV, (b) the corresponding image segment of the second image that represents the corresponding region of the second FOV, based on the given image segment of the first image that represents the given region of the first FOV.

DETAILED DESCRIPTION OF THE DRAWINGS

Figure 2:
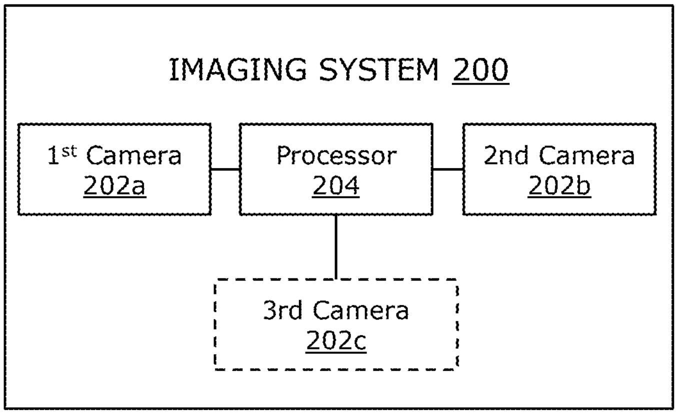
FIG. 2 illustrates a block diagram of an architecture of an imaging system incorporating denoising, in accordance with an embodiment of the present disclosure.

Referring to FIG. 2, illustrated is a block diagram of an architecture of an imaging system 200 incorporating denoising in multi-camera systems, in accordance with an embodiment of the present disclosure. The imaging system 200 comprises a first camera 202*a*, a second camera 202*b*, and at least one processor (depicted as a processor 204). Optionally, the imaging system 200 further comprises at least one third camera (depicted as a third camera 202*c*). The processor 204 is communicably coupled to the first camera 202*a*, the second camera 202*b*, and the third camera 202*c*. The processor 204 is configured to perform various operations, as described earlier with respect to the aforementioned first aspect.

It may be understood by a person skilled in the art that the FIG. 2 includes a simplified architecture of the imaging system 200 for sake of clarity, which should not unduly limit the scope of the claims herein. It is to be understood that the specific implementations of the imaging system 200 are provided as examples and are not to be construed as limiting it to specific numbers or types of cameras and/or processors. The person skilled in the art will recognize many variations, alternatives, and modifications of embodiments of the present disclosure.

Figure 3:
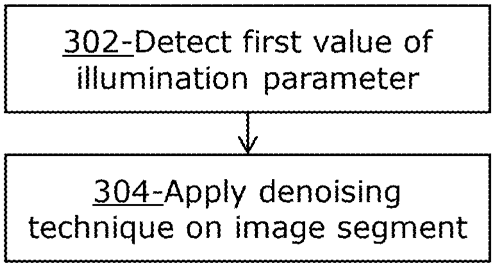
FIG. 3 illustrates steps of a method incorporating denoising in multi-camera systems, in accordance with an embodiment of the present disclosure.

Referring to FIG. 3, illustrated are steps of a method incorporating gaze-directed denoising in multi-camera systems, in accordance with an embodiment of the present disclosure. At step 302, it is detected whether a first camera has a first value of an illumination parameter in at least one first region of a first field of view (FOV) of the first camera, while a second camera has, in at least one corresponding region of a second FOV of the second camera, a second value of the illumination parameter that is greater than the first value, wherein the first camera and the second camera are to be employed to simultaneously capture a first image and a second image, respectively, and wherein the illumination parameter varies spatially across the first FOV and the second FOV, the illumination parameter being any one of: (i) a ratio of a per-pixel area (A) to pixels per degree (PPD), (ii) a ratio of a multiplication product of the per-pixel area and a relative illumination (A×RI) to the PPD. When it is detected that the first camera has the first value of the illumination parameter in the at least one first region, while the second camera has the second value of the illumination parameter that is greater than the first value in the at least one corresponding region, at step 304, a denoising technique is applied on at least one first image segment of the first image that represents the at least one first region of the first FOV, based on at least one corresponding image segment of the second image that represents the at least one corresponding region of the second FOV.

The aforementioned steps are only illustrative and other alternatives can also be provided where one or more steps are added, one or more steps are removed, or one or more steps are provided in a different sequence without departing from the scope of the claims.

Figure 4A:
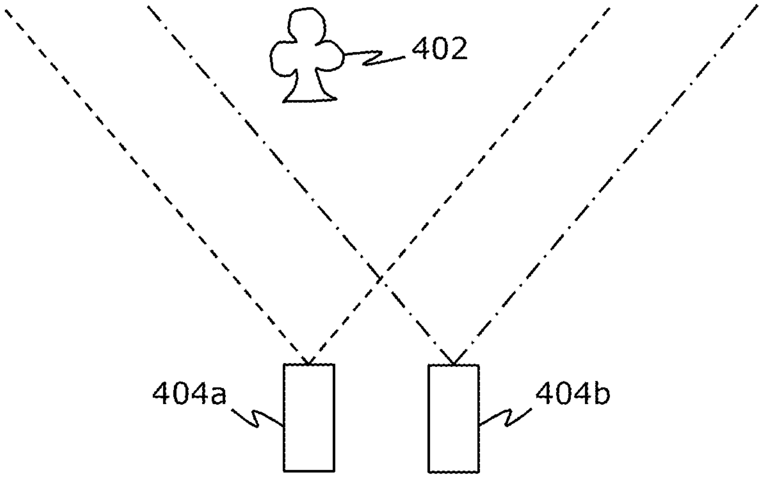
Figure 4B:
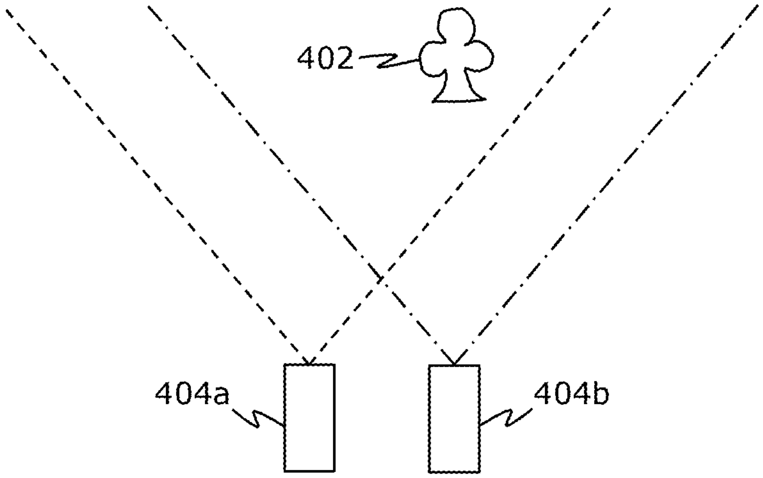
Figure 4C:
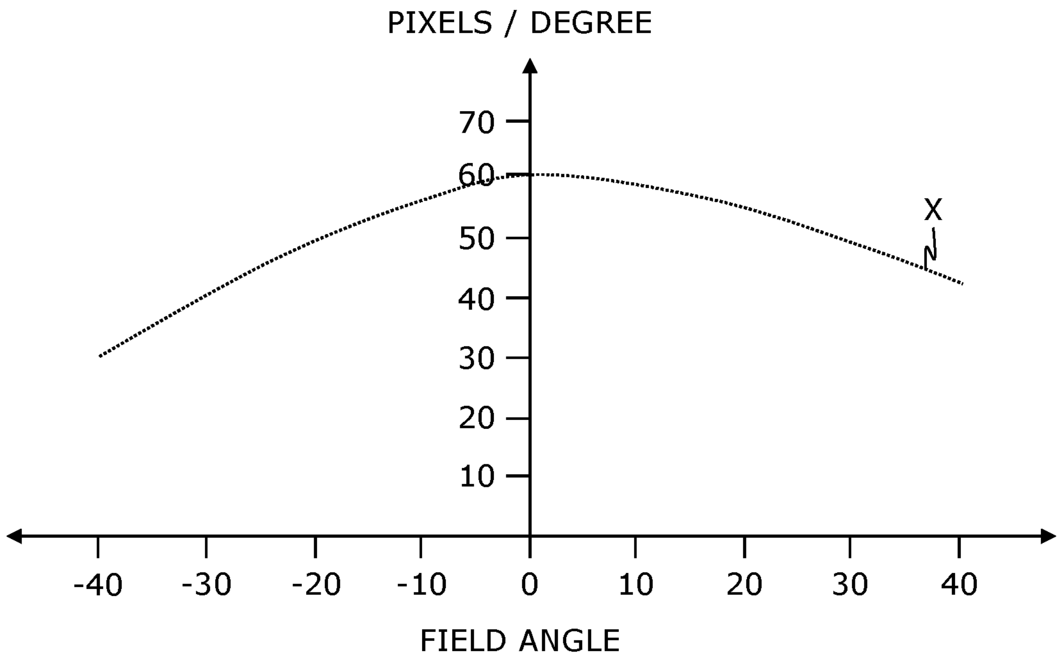
FIG. 4C illustrates an exemplary graphical representation of a variation of an angular resolution of a first camera and a second camera as a function of an angular width of their respective field of view, in accordance with an embodiment of the present disclosure.

Referring to FIGS. 4A, 4B and 4C, FIGS. 4A and 4B illustrate two different exemplary scenarios of imaging an object 402 present in a real-world environment, while FIG. 4C illustrates an exemplary graphical representation of a variation of an angular resolution of a given camera (namely, a first camera and a second camera) as a function of an angular width of a field of view of said given camera, in accordance with an embodiment of the present disclosure.

With reference to FIGS. 4A and 4B, the object 402 is being imaged by a first camera 404*a* and a second camera 404*b* that are arranged in a side-by-side manner. In some implementations, the first camera 404*a* and the second camera 404*b* form a stereo pair. In other implementations, the first camera 404*a* and the second camera 404*b* do not form a stereo pair. With reference to FIG. 4A, in a first scenario, the object 402 lies at a central region of a first field of view (FOV) (for example, depicted using dashed lines) of the first camera 404*a*. The (same) object 402 lies towards a left-side of a peripheral region of a second FOV (for example, depicted using dash-dot lines) of the second camera 404*b*, wherein the peripheral region of the second FOV surrounds a central region of the second FOV. With reference to FIG. 4B, in a second scenario, the object 402 lies towards a right-side of a peripheral region of the first FOV of the first camera 404*a*, wherein the peripheral region of the first FOV surrounds the central region of the first FOV, while the (same) object 402 lies at the central region of the second FOV of the second camera 404*b*.

With reference to FIG. 4C, a curve X represents a variation of an angular resolution of both the first camera 404*a* and the second camera 404*b* with respect to angular widths of their respective fields of view. As shown, the angular resolution is maximum at a central region of a given FOV of the given camera, and decreases on going away from the central region towards a peripheral region of the given FOV, the peripheral region of the given FOV surrounding the central region of the given FOV. The angular resolution is, for example, expressed in terms of pixels per degree (PPD). When the illumination parameter is employed as (i) A/PPD, the illumination parameter varies spatially across the first FOV and across the second FOV, and is inversely proportional to the angular resolution (namely, the PPD). In this regard, greater the PPD of a given region in the given FOV, lesser is a value of the illumination parameter in the given region of the given FOV, and vice versa. Greater the PPD, greater is the probability of capturing a given region of a given image with noise and less brightness, and vice versa.

For the first scenario (in which the object 402 lies at the central region of the first FOV of the first camera 404*a*, but lies towards the left-side of the peripheral region of the second FOV of the second camera 404*b*), it can be inferred that a value of the illumination parameter in the left side of the peripheral region of the second FOV would be greater than a value of the illumination parameter in the central region of the first FOV. In such a case, a first image segment of a first image captured by the first camera 404*a* (corresponding to the central region of the first FOV) represents the object 402 with a relatively higher resolution, a relatively lower brightness, and a relatively higher noise (but without any blurriness), as compared to a corresponding image segment of a second image captured by the second camera 404*b* (corresponding to the left-side of the peripheral region of the second FOV) that represents the same object 402. Therefore, in order to correct the first image segment (in terms of noise and brightness), a denoising technique would be applied on the first image segment of the first image, based on the corresponding image segment of the second image. Additionally, optionally, in order to correct the corresponding image segment (in terms of blurriness), at least one image restoration technique (such as deblurring technique) could be applied on the corresponding image segment of the second image, based on the first image segment of the first image.

Furthermore, for the second scenario (in which the object 402 lies towards the right-side of the peripheral region of the first FOV of the first camera 404*a*, but lies at the central region of the second FOV of the second camera 404*b*), it can be inferred that a value of the illumination parameter in the right side of the peripheral region of the first FOV would be greater than a value of the illumination parameter in the central region of the second FOV. In such a case, a second image segment of the second image (corresponding to the central region of the second FOV) represents the object 402 with a relatively higher resolution, a relatively lower brightness, and a relatively higher noise (but without any blurriness), as compared to a corresponding image segment of the first image (corresponding to the right-side of the peripheral region of the first FOV) that represents the same object 402. Therefore, in order to correct the second image segment (in terms of noise and brightness), the denoising technique is applied on the second image segment of the second image, based on the corresponding image segment of the first image. Additionally, optionally, in order to correct the corresponding image segment of the first image (in terms of blurriness), the at least one image restoration technique is applied on the corresponding image segment of the first image, based on the second image segment of the second image.

Figure 5:
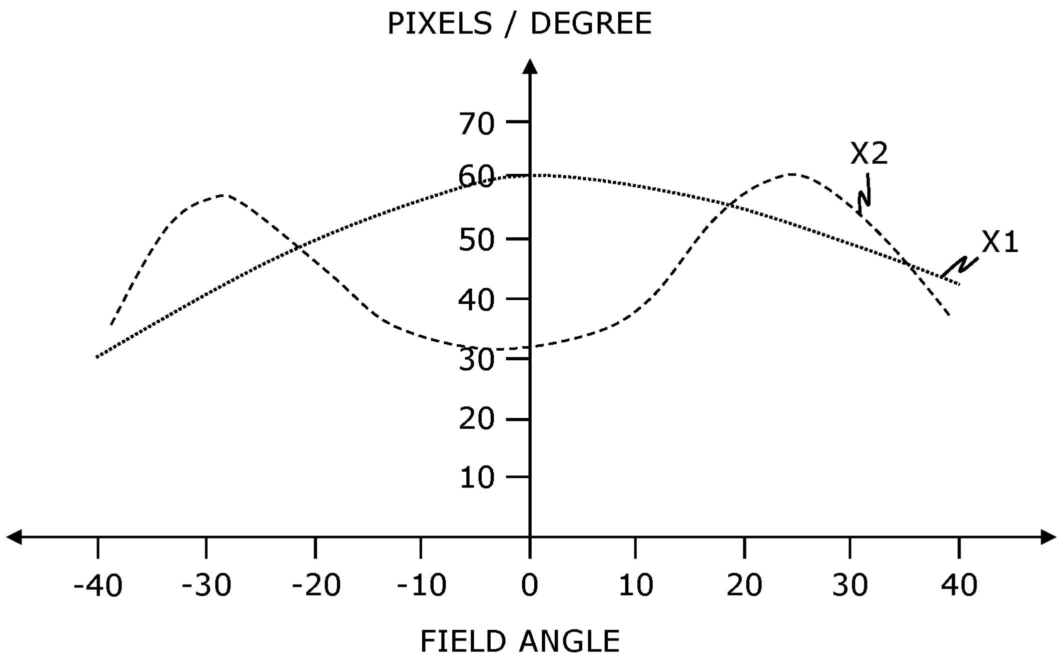
FIG. 5 illustrates another exemplary graphical representation of variations of angular resolutions of a first camera and a second camera as a function of angular widths of their respective field of view, in accordance with an embodiment of the present disclosure.

Referring next to FIG. 5, there is illustrated another exemplary graphical representation of variations of angular resolutions of a first camera and a second camera as a function of angular widths of their respective fields of view, in accordance with an embodiment of the present disclosure. With reference to FIG. 5, a curve X1 represents a variation of an angular resolution of the first camera with respect to an angular width of its field of view, whereas a curve X2 represents a variation of an angular resolution of the second camera with respect to an angular width of its field of view. As shown, for the curve X1, the angular resolution of the first camera is maximum at the central region of the first FOV, and decreases on going away from the central region towards the peripheral region of the first FOV. For the curve X2, the angular resolution of the second camera is minimum at the central region of the second FOV, and increases on going away from the central region towards the peripheral region of the second FOV to reach a maximum value, and then decreases again.

In an implementation, the first camera and the second camera could be employed for capturing images from a perspective of a same eye; in such a case, the first camera and the second camera could be arranged in a manner the first FOV almost fully overlaps with the second FOV. In such a case, a same object would lie almost at a same position within the first FOV as well as within the second FOV. This may, for example, be feasible when the first camera and the second camera are arranged in a top-to-bottom manner in a quad camera system.

In one case, when the same object lies at the central region of the first FOV and at the central region of the second FOV, a first image segment of a first image captured by the first camera (corresponding to the central region of the first FOV)

represents the object with a relatively higher resolution, a relatively lower brightness, and a relatively higher noise (but without any blurriness), as compared to a corresponding image segment of a second image captured by the second camera (corresponding to the central region of the second FOV) that represents the same object. Therefore, in order to correct the first image segment (in terms of noise and brightness), a denoising technique would be applied on the first image segment of the first image, based on the corresponding image segment of the second image. Additionally, optionally, in order to correct the corresponding image segment of the second image (in terms of blurriness), at least one image restoration technique could be applied on said corresponding image segment of the second image, based on the first image segment of the first image.

In another case, when the same object lies towards a right-side of the peripheral region of the first FOV whereat the angular resolution of the first camera is low, and towards a right-side of the peripheral region of the second FOV whereat the angular resolution of the second camera is maximum, a second image segment of the second image (corresponding to the right-side of the peripheral region of the second FOV) represents the object with a relatively higher resolution, a relatively lower brightness, and a relatively higher noise (but without any blurriness), as compared to a corresponding image segment of the first image (that corresponds to the right-side of the peripheral region of the first FOV) that represents the same object. Therefore, in order to correct the second image segment of the second image (in terms of noise and brightness), the denoising technique would be applied on the second image segment of the second image, based on the corresponding image segment of the first image. Additionally, optionally, in order to correct the corresponding image segment of the first image (in terms of blurriness), at least one image restoration technique could be applied on said corresponding image segment of the first image, based on the second image segment of the second image.

FIGS. 4A-4C and 5 are merely examples, which should not unduly limit the scope of the claims herein. The person skilled in the art will recognize many variations, alternatives, and modifications of embodiments of the present disclosure.

The invention claimed is:

1. An imaging system comprising:

a first camera and a second camera that are to be employed to simultaneously capture a first image and a second image, respectively, wherein an illumination parameter varies spatially across a first field of view (FOV) of the first camera, and across a second FOV of the second camera, the illumination parameter being any one of:

(i) a ratio of a per-pixel area (A) to pixels per degree (PPD), (ii) a ratio of a multiplication product of the per-pixel area and a relative illumination (A×RI) to the PPD;

at least one processor configured to:

detect whether the first camera has a first value of the illumination parameter in at least one first region of the first FOV, while the second camera has, in at least one corresponding region of the second FOV, a second value of the illumination parameter that is greater than the first value; and when it is detected that the first camera has the first value of the illumination parameter in the at least one first region, while the second camera has the second value of the illumination parameter that is greater than the first value in the at least one corresponding region, apply a denoising technique on at least one first image segment of the first image that represents the at least one first region of the first FOV, based on at least one corresponding image segment of the second image that represents the at least one corresponding region of the second FOV; and at least one third camera that is to be employed to capture at least one third image simultaneously with the first image and the second image, wherein the illumination parameter varies spatially across at least one third FOV of the at least one third camera, wherein the at least one processor is configured to:

detect when a region of interest within a given FOV, from amongst the first FOV, the second FOV and the at least one third FOV, has a value of the illumination parameter that is smaller than a first predefined threshold or is smaller than at least one of individual values of the illumination parameter in corresponding regions of a remainder of the first FOV, the second FOV and the at least one third FOV by at least a second predefined threshold;

calculate respectively differences between the value of the illumination parameter in the region of interest of the given FOV and the individual values of the illumination parameter in the corresponding regions of the remainder of the first FOV, the second FOV and the at least one third FOV;

determine one of the remainder whose difference is largest amongst the calculated differences; and apply the denoising technique on an image segment of a given image that represents the region of interest of the given FOV, based on a corresponding image segment of another image that represents a corresponding region of the determined one of the remainder, wherein the given image corresponds to the given FOV, while the another image corresponds to the determined one of the remainder.

2. The imaging system of claim 1, wherein the at least one processor is configured to apply at least one image restoration technique on the at least one corresponding image segment of the second image, based on the at least one first image segment of the first image, when it is detected that the first camera has the first value of the illumination parameter in the at least one first region, while the second camera has the second value of the illumination parameter that is greater than the first value in the at least one corresponding region.

3. The imaging system of claim 1, wherein the at least one processor is configured to:

detect whether the second camera has a third value of the illumination parameter in at least one second region of the second FOV, while the first camera has, in at least one corresponding region of the first FOV, a fourth value of the illumination parameter that is greater than the third value; and when it is detected that the second camera has the third value of the illumination parameter in the at least one second region, while the first camera has the fourth value of the illumination parameter that is greater than the third value in the at least one corresponding region, apply the denoising technique on at least one second image segment of the second image that represents the at least one second region of the second FOV, based on at least one corresponding image segment of the first image that represents the at least one corresponding region of the first FOV.

4. The imaging system of claim 3, wherein the at least one processor is configured to apply at least one image restoration technique on the at least one corresponding image segment of the first image, based on the at least one second image segment of the second image, when it is detected that the second camera has the third value of the illumination parameter in the at least one second region, while the first camera has the fourth value of the illumination parameter that is greater than the third value in the at least one corresponding region.

5. The imaging system of claim 1, wherein the at least one processor is configured to:

obtain information indicative of a first gaze direction of a first eye;

determine a gaze region within the first FOV, based on the first gaze direction; and select the at least one first region of the first FOV, based on the gaze region within the first FOV, wherein the at least one first region includes and surrounds the gaze region.

6. The imaging system of claim 1, wherein the at least one processor is configured to:

obtain information indicative of a first gaze direction of a first eye;

determine a gaze region within the first FOV, based on the first gaze direction; and select the at least one first region of the first FOV, based on the gaze region within the first FOV, wherein the at least one first region is a peripheral region that surrounds the gaze region.

7. The imaging system of claim 1, wherein the at least one processor is configured to:

identify at least one salient feature in the first image;

identify at least one image segment of the first image that includes the at least one salient feature; and select the at least one first region of the first FOV as at least one region of the first FOV that corresponds to the at least one image segment of the first image.

8. The imaging system of claim 1, wherein the at least one processor is configured to:

detect when a difference between a value of the illumination parameter of a given region of the first FOV and another value of the illumination parameter of a corresponding region of the second FOV is smaller than a third predefined threshold; and when it is detected that the difference is smaller than the third predefined threshold, apply at least one of: another denoising technique, at least one image restoration technique on at least one of:

(a) a given image segment of the first image that represents the given region of the first FOV, based on a corresponding image segment of the second image that represents the corresponding region of the second FOV, (b) the corresponding image segment of the second image that represents the corresponding region of the second FOV, based on the given image segment of the first image that represents the given region of the first FOV.

9. A method comprising:

detecting whether a first camera has a first value of an illumination parameter in at least one first region of a first field of view (FOV) of the first camera, while a second camera has, in at least one corresponding region of a second FOV of the second camera, a second value of the illumination parameter that is greater than the first value, wherein the first camera and the second camera are to be employed to simultaneously capture a first image and a second image, respectively, and wherein the illumination parameter varies spatially across the first FOV and the second FOV, the illumination parameter being any one of:

(i) a ratio of a per-pixel area (A) to pixels per degree (PPD), (ii) a ratio of a multiplication product of the per-pixel area and a relative illumination (A×RI) to the PPD; and when it is detected that the first camera has the first value of the illumination parameter in the at least one first region, while the second camera has the second value of the illumination parameter that is greater than the first value in the at least one corresponding region, applying a denoising technique on at least one first image segment of the first image that represents the at least one first region of the first FOV, based on at least one corresponding image segment of the second image that represents the at least one corresponding region of the second FOV;

wherein at least one third camera is employed to capture at least one third image simultaneously with the first image and the second image, wherein the illumination parameter varies spatially across at least one third FOV of the at least one third camera, wherein the method further comprises:

detecting when a region of interest within a given FOV, from amongst the first FOV, the second FOV and the at least one third FOV, has a value of the illumination parameter that is smaller than a first predefined threshold or is smaller than at least one of individual values of the illumination parameter in corresponding regions of a remainder of the first FOV, the second FOV and the at least one third FOV by at least a second predefined threshold;

calculating respectively differences between the value of the illumination parameter in the region of interest of the given FOV and the individual values of the illumination parameter in the corresponding regions of the remainder of the first FOV, the second FOV and the at least one third FOV;

determining one of the remainder whose difference is largest amongst the calculated differences; and applying the denoising technique on an image segment of a given image that represents the region of interest of the given FOV, based on a corresponding image segment of another image that represents a corresponding region of the determined one of the remainder, wherein the given image corresponds to the given FOV, while the another image corresponds to the determined one of the remainder.

10. The method of claim 9, further comprising applying at least one image restoration technique on the at least one corresponding image segment of the second image, based on the at least one first image segment of the first image, when it is detected that the first camera has the first value of the illumination parameter in the at least one first region, while the second camera has the second value of the illumination parameter that is greater than the first value in the at least one corresponding region.

11. The method of claim 9, further comprising:

detecting whether the second camera has a third value of the illumination parameter in at least one second region of the second FOV, while the first camera has, in at least one corresponding region of the first FOV, a fourth value of the illumination parameter that is greater than the third value; and when it is detected that the second camera has the third value of the illumination parameter in the at least one second region, while the first camera has the fourth value of the illumination parameter that is greater than the third value in the at least one corresponding region, applying the denoising technique on at least one second image segment of the second image that represents the at least one second region of the second FOV, based on at least one corresponding image segment of the first image that represents the at least one corresponding region of the first FOV.

12. The method of claim 11, further comprising applying at least one image restoration technique on the at least one corresponding image segment of the first image, based on the at least one second image segment of the second image, when it is detected that the second camera has the third value of the illumination parameter in the at least one second region, while the first camera has the fourth value of the illumination parameter that is greater than the third value in the at least one corresponding region.

13. The method of claim 9, further comprising:

detecting when a difference between a value of the illumination parameter of a given region of the first FOV and another value of the illumination parameter of a corresponding region of the second FOV is smaller than a third predefined threshold; and when it is detected that the difference is smaller than the third predefined threshold, applying at least one of: another denoising technique, at least one image restoration technique on at least one of:

(a) a given image segment of the first image that represents the given region of the first FOV, based on a corresponding image segment of the second image that represents the corresponding region of the second FOV, (b) the corresponding image segment of the second image that represents the corresponding region of the second FOV, based on the given image segment of the first image that represents the given region of the first FOV.

* * * * *